H. PENOYER.
Bee Hive.
No. 46,584. Patented Feb. 28, 1865.
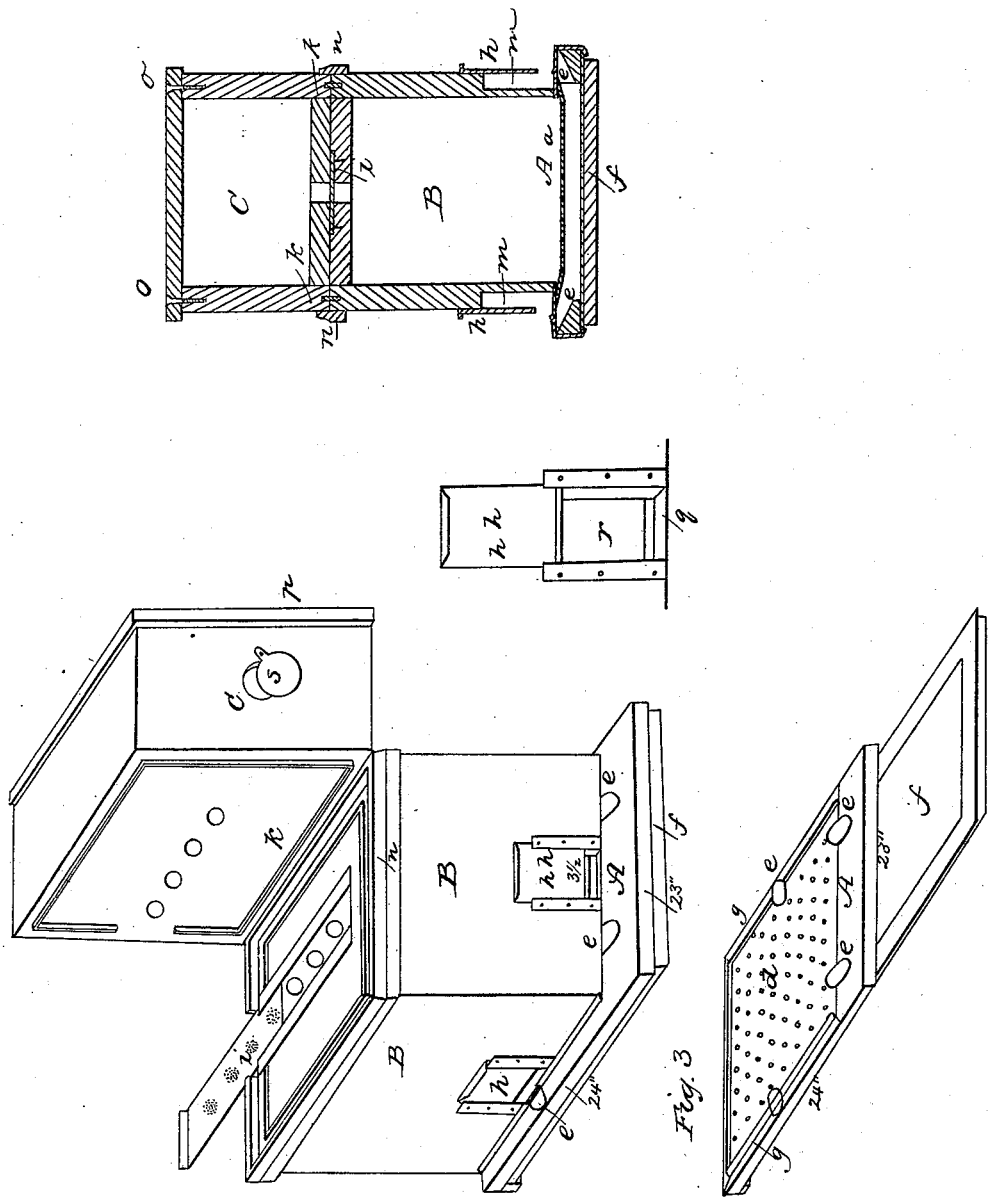

UNITED STATES PATENT OFFICE.

HIRAM PENOYER, OF CENTRALIA, ILLINOIS.

IMPROVEMENT IN BEE-HIVES.

Specification forming part of Letters Patent No. 46,584, dated February 28, 1865.

*To all whom it may concern:*

Be it known that I, HIRAM PENOYER, of Centralia, in the county of Marion and State of Illinois, have invented a new and useful Improvement in a Bee-Hive; and I do hereby declare that the following is a full, clear, and exact description of the construction of the same, reference being had to the annexed drawings, making a part of this specification, in which—

Figure I is a perspective view with disconnected upper box of the bee-hive; Fig. II, a cross-section of the bee-hive; Fig. III, the lower part of the bee-hive.

The letters of reference and all the figures represent the same parts wherever they occur.

The bee-hive consists of three different parts. The lower part, Fig. III, is a litter box or drawer, A, and covered with a perforated sheet of zinc for letting the air and litter through. The holes of the under side of the sheet are sharp, like a grater, which prevent the moths and other insects from getting through into the hive. This drawer A is shut below by a wooden slide, $f$. The holes $c\ c\ c\ c$ lead into the drawer A only.

The middle box, B, has no bottom, but can be connected with the drawer by sliding it between the zinc straps $g\ g$, which are fastened to the drawer A. This box B has only one entrance, $q$, for the bees, which can be shut up by a zinc slide, $h\ h$. Immediately behind the slide $h\ h$ and above the entrance is a dark closet or apartment cut in the wall of the box. Two more such apartments, but without any passage into the box B, are cut on both sides of box B, and can be shut by the slides $h$. (See Fig. II.) The top of box B has four holes, shut up by a zinc slide, $i$, which is perforated for ventilating the hive, Fig. I.

The upper part, box C, stands on top of box B. A wooden rim, N, fastened to box B, holds box C firm in its place, and is used to suspend the hive by when placed in the bee-house, or on a frame made to suspend the hive on. A zinc strap, $k$, fastened to C around the bottom, is projecting and fits in a groove cut in the top of box B. Four holes in the bottom of box C fit exactly the four holes in the top of box B, and by pulling out the slide $i$ those holes make a communication between both boxes. The top of box C can be removed by unscrewing the screws O O, Fig. II. Box C is divided into two equal parts by a slide-partition, (vertical,) so that the bees can be let into one-half of the box at a time by drawing the zinc slide $i$ half-way out, or into the whole box by drawing it clear out.

The nature of my invention consists in keeping moths out of the bee-hive.

The only entrance into box B will be guarded by the bees.

The holes $c\ c\ c\ c$ and the small apartments behind the slides $h$ and $h\ h$ are for the purpose of misleading the moths to deposit their eggs in said apartments, or in the drawer A.

The zinc strap $k$ on the bottom of box C is to prevent moths coming into box C.

What I claim as my invention, and desire to secure by Letters Patent, is—

1. The dark chambers $m\ m$ above the side entrance, $e\ e$, to the litter box below, in combination with said litter-box A, constructed with a sliding bottom, $f$, all constructed and arranged as and for the purposes described.

2. The main hive B, with its entrance $q$ and dark chamber $r$, in combination with the litter-box A, provided with entrances $e\ e$ on each side of entrance $q$, and sliding bottom $f$, when constructed and arranged as and for the purposes described.

HIRAM PENOYER.

Witnesses:
CYRUS PHELPS,
HENRY PHELPS.